2,920,116
METHOD OF MAKING NAPHTHALENE AND LOWER-BOILING COMPOUNDS FROM CREOSOTE OIL

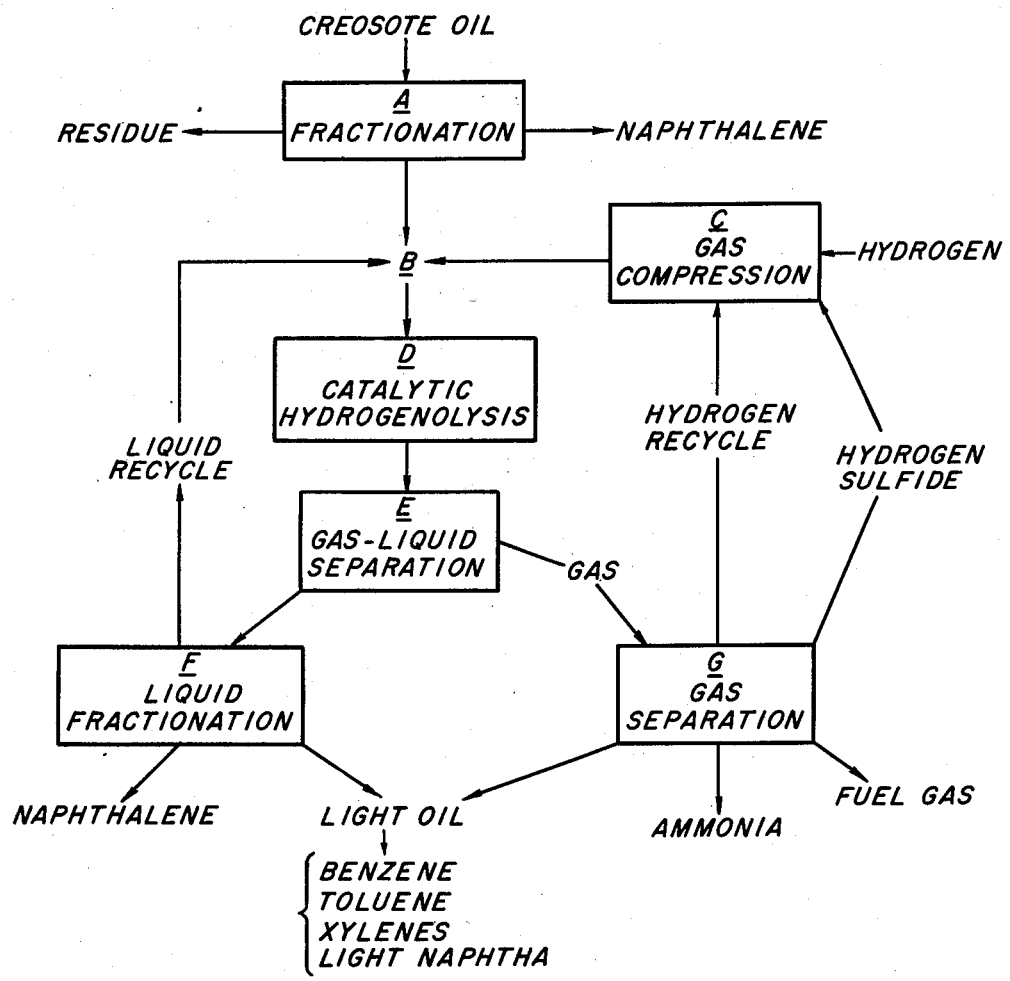

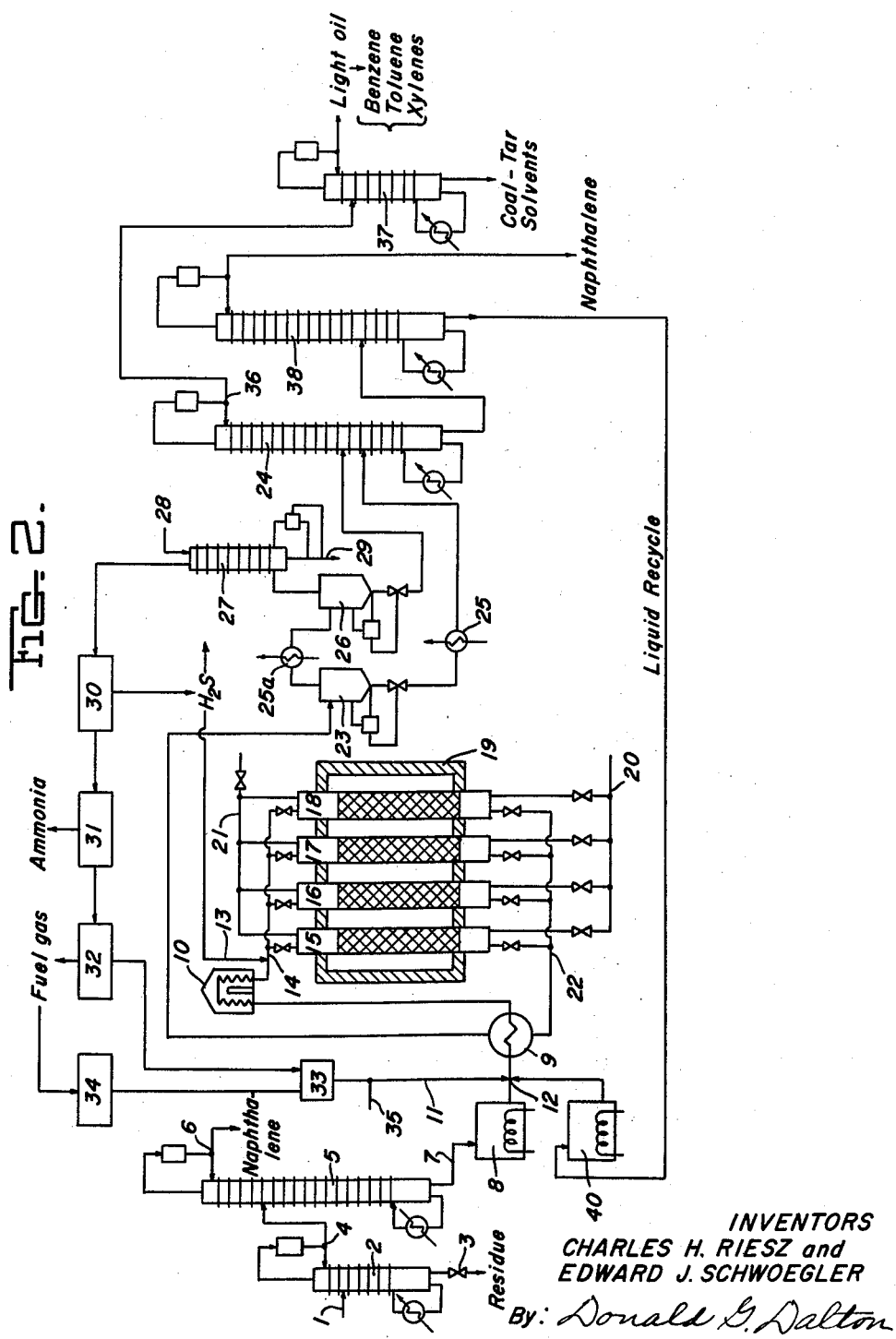

Charles H. Riesz, Chicago, Ill., and Edward J. Schwoegler, Munster, Ind., assignors, by mesne assignments, to United States Steel Corporation, New York, N.Y., a corporation of New Jersey Application August 16, 1957, Serial No. 678,663

2 Claims. (Cl. 260—668)

This invention relates to the treatment of coal-tar distillate, specifically creosote oil, to convert it into naphthalene and other compounds having boiling points lower than that of naphthalene.

Creosote oil represents a large fraction of the distillate from coal tar. It is used principally for wood preservation. An excess over the current market requirements for that purpose is produced in the coking of coal. It is accordingly the object of our invention to provide a method for converting the components of creosote oil into more readily marketable compounds such as naphthalene, benzene, toluene, xylenes and the like.

Our invention, generally speaking, is a method for the hydrogenolysis of creosote oil, under heat and pressure, in the presence of catalysts of the molybdenum type. The specific hydrogenolysis with which we are concerned provides good yields of naphthalene as well as compounds having boiling points lower than that of naphthalene. The hydrogenolysis reactions include: destruction of heterocyclic compounds containing sulfur, nitrogen and oxygen; sundering of ring and heterocyclic ring systems; sundering of fused rings and dealkylation, as well as hydrogenation of the derived fragments.

We have discovered that good yields of naphthalene and other compounds of low molecular weight such as benzene, toluene and xylene, may be obtained from creosote oil by bringing it into contact with a catalyst of the molybdenum type in the presence of hydrogen, under suitable conditions of temperature and pressure, if the catalyst contains or is supplied with sulfur in adequate amounts as indicated below. The temperature at which the process is carried out is between 450° and 650° C., preferably at about 530° C. The pressure of hydrogen (or its partial pressure, if other gases are present) should be between 500 and 2500 p.s.i.g., but 700–1000 p.s.i.g. is preferred for practical reasons. The hydrogen is consumed in our process in amounts of from 1 to 4% of the weight of the creosote oil. The liquid hourly space velocity (LHSV), defined as the unit volume of oil per hour undergoing treatment, relative to unit volume of catalyst, should be from 0.2 to 3.0 and should preferably be about 0.5 v./v./hr.

Cresote oil generally contains some naphthalene. We find that a higher net yield of naphthalene is obtained by our process if most of the naphthalene initially present in the creosote oil is removed. We therefore preferably subject the crude creosote oil, which may have a boiling range from 185° to 440° C., to a preliminary fractionation so as to separate compounds boiling below about 220° C. (including any naphthalene present), and those boiling above about 350° C. The latter are objectionable because of their pitchy character and tendency to coat the catalyst.

The catalyst may be any molybdenum-type catalyst suitably activated by sulfidation. The constituents may include reduced molybdenum, oxides and sulfides of molybdenum, as well as mixed oxides and sulfides of molybdenum and cobalt, cobalt molybdate, or cobalt thiomolybdate and mixtures thereof, suitably supported on a carrier. The carrier can be selected from materials known in the art such as alumina, activated alumina, bauxite, silica, silica-alumina combinations, calcium aluminum silicate and the like. A suitable catalyst contains about 9.5% molybdenum oxide, 3% cobalt oxide, 5% silica, and the balance alumina. Catalysts of this general type and the use thereof are described in United States Patent No. 2,325,033.

An important part of our invention is the sulfiding treatment necessary to provide high catalyst activity. For example, a catalyst comprising 10% molybdenum oxide on alumina has been found very satisfactory when properly activated by appropriate sulfide treatment. It has been found that if the creosote oil contains as little as 0.03% sulfur, the hydrogenolysis activity of the catalyst is very low. If the feed contains between 0.1 and 3.0% sulfur, however, the catalyst is continuously maintained in a highly sulfided condition. A preferred catalyst sulfide treatment produces a sulfur/metal mole ratio of approximately 1/1. This ratio may, however, vary from 0.1/1 to 2/1. The sulfur necessary for the method may be that present in the creosote oil or it may be obtained by a suitable addition of a creosote oil having a high sulfur content. Alternately, sulfur compounds may be added to the feed, for example, thiophene, thionaphthene, mercaptans, sulfides and disulfides. Elemental sulfur and hydrogen sulfide are other sources which are particularly desirable since these may be byproducts of the process.

A complete understanding of our invention may be obtained from the following detailed description and explanation which refer to the accompanying drawings illustrating the present preferred practice. In the drawings:

Figure 1 is a flow diagram; and
Figure 2 is a diagrammatic showing of a plant adapted for carrying out our method.

Referring now in detail to the drawings and, for the present, particularly to Figure 1, creosote oil is subjected to a fractionation A to remove most of the naphthalene (if present) as an overhead product leaving a residue of high-boiling material. The collected fraction having a boiling range of 220°–350° C. is typical of the feedstock preferred for use in our method. This product is mixed at B with hydrogen and hydrogen sulfide from a compression stage C. The mixture is subjected to a catalytic hydrogenolysis at D and after cooling, the gaseous and liquid products thereof, viz., naphthalene and light oil, are separated at E. The liquid products are fractionated at F and the gases are separated at G. The unconverted creosote oil, boiling above naphthalene, is recycled from F to B and hydrogen sulfide from G to C, to maintain the catalyst in D in effective condition. Hydrogen recovered from the reaction is recycled from G to C and again compressed with make-up hydrogen for re-use in the hydrogenolysis.

A complete system for our method is shown in Figure 2. The creosote-oil feed first enters at 1 into a distilling column 2 where the heavy residue is separated and removed at 3. The overhead product is cooled and condensed and part is used for reflux at 4 but the major portion is pumped to a fractionating column 5. (Throughout the system, pumps and compressors are installed where needed, without reference in the description.) Column 5 removes naphthalene as an overhead distillate at 6 but the major portion is recovered as a distillation residue at 7 and is sent to a storage tank 8. Tank 8 is equipped with a steam coil to maintain the creosote oil in the liquid state. Columns 2 and 5 are not necessary but are a desirable means of preparing the feed stock. From tank 8, the creosote oil is first heated by an exchanger 9 and then by a direct-fired heater 10. A gas stream 11 which is essentially hydrogen is admixed with the creosote oil by a gas compressor 35, upstream from heater 9. A liquid recycle stream enters the main liquid feed at 12. The amount of the recycle may vary within wide limits, e.g., from 0 to 10 times the weight of fresh feed. At 13 a stream of hydrogen sulfide is admixed with the heated creosote-hydrogen mixture to maintain the sulfur content of the feed to the catalyst at the proper level.

The products issuing from the direct-fired heater 10 are at a temperature of about 530° C., but this temperature may range from 450° to 650° C. The feed mixture of creosote oil, hydrogen and hydrogen sulfide enters manifold 14 and is distributed to one or more catalyst tubes 15, 16, 17, 18 of conventional character, mounted in a furnace 19. The catalyst temperature is maintained within the temperature range 450° to 650° C. The pressure in the catalyst tubes is within the range of 500–2500 p.s.i.g. Manifold 20 is designed to admit oxygen-containing gases to perform regeneration of the catalyst periodically and manifold 21 is used to vent the regeneration gases. The cobalt-molybdenum type catalyst is distributed in tubes 15, 16, 17 and 18 in the usual manner. The feed of creosote oil is maintained so that the LHSV is from 0.2 to 3.00, preferably about 0.5 v./v./hr. The reaction products flow through manifold 22 then through exchanger 9 interchanging heat with the incoming process material. The effluent gases and the reaction products then enter a primary separator 23 of any desired type such as a dephlegmator where the highest-boiling portions are separated, passed through a cooler 25 and then are released to a fractionating column 24. The more volatile products pass through a cooler 25a to a secondary separator 26 where a gas-liquid separation is made.

The gases, including substantial amounts of hydrogen plus the gaseous hydrogenolysis products, are passed through an oil scrubber 27. Lean absorber oil introduced thereto from a source 28 absorbs the light oil content of the gas and the enriched oil is discharged at 29 and pumped to a recovery plant (not shown). The scrubbed gas is subjected to hydrogen-sulfide removal at 30 by well-known means, such as an ethanolamine process. The hydrogen sulfide is recovered and at least a portion thereof is recycled to the feedstock at 13 as shown, downstream from heater 10. The process gas is then treated by a standard apparatus 31, for example an ammonium-sulfate absorber, to remove ammonia. The purified gases are then cooled and by any of the known methods, such as low-temperature distillation for example, at 32, and a hydrogen stream is recovered and returned to the process through a gas-holder 33. The gases boiling above hydrogen such as methane, ethane, propane, and the like, may be used as fuel gas or as feed for a hydrogen reformer 34, to generate more hydrogen for the process. A compressor 35 takes gas from the holder 33 and returns this gas of high hydrogen content to the process.

The liquid product from secondary separator 26 is introduced into a distilling column 24 where material boiling below naphthalene is taken overhead at 36 to a distilling column 37. In column 37, coal tar solvent is the bottoms product while light oil, comprising benzene, toluene and xylene is the overhead product. The latter compounds are separated and refined by conventional procedures. The bottoms from column 24 are pumped to a distilling column 38. In column 38, naphthalene of high purity can be recovered overhead, for example, a product melting at from 77° to 79° C. Material boiling above naphthalene is transferred to a storage tank 40, which has a steam coil for keeping the recycled material in a fluid state, for return to feed stream at 12.

In a typical example of the practice of our method, pellets comprising 240 ml. (244.5 g.) of cobalt-molybdenum catalyst were charged into a suitable reactor such as described above. A slow stream of hydrogen was allowed to flow through the catalyst bed at atmospheric pressure as the temperature thereof was raised to 100° C. The temperature was held at 100° C. under the purging conditions for 30 minutes to insure removal of extraneous moisture from the catalyst. The system was then placed under 100 p.s.i.g. hydrogen pressure and the catalyst bed heated to 540° C. The hydrogen pressure was then raised to 1000 p.s.i.g. A creosote oil with a boiling range of 196°–350° C. and a naphthalene content of 12.3% by weight, was fractionated to remove compounds boiling below 230° C. and fed to the catalyst tubes. The LHSV varied between 0.40 and 0.50 v./v./hr. The reaction was continued for a 50-hour period and during this period, 5.60 kilograms of feedstock were processed. Eighty-five percent of the feedstock was recovered as liquid products and 14% as gaseous products. The liquid product was fractionated to a 230° C. cut point and analyzed. Eighteen percent of this product boiled below 195° C. and consisted chiefly of aromatic hydrocarbons. Approximately 30% boiled between 195° and 232° C. and contained 76% naphthalene. A 90% cut of the naphthalene recovered melted at 70.8° C. Allowing for the naphthalene in the feed, an additional 11% of naphthalene was obtained. Approximately 29% of the creosote oil was converted to lower-boiling aromatic hydrocarbons and naphthalene. Adding to this the 12.3% naphthalene from the feed gives a total recovery of low-boiling aromatics and naphthalene of 41%. Although this run was discontinued at the end of 50 hours, the catalyst appeared to have suffered no loss in activity.

Creosote oils of varying boiling range may be processed by our method as shown in the following examples. A cobalt-molybdenum catalyst was used in each case.

Table I

| Example | Boiling Range— Creosote Oil, ° C. | Temp. of Reaction, ° C. | $H_2$, Pressure, p.s.i.g. | LHSV, v./v./hr. | Percent of Feed Converted to Naphthalene [1] | Percent of Feed Converted to Lower-Boiling Aromatics |
|---|---|---|---|---|---|---|
| 2 | 230–385 | 530 | 720 | 0.49 | 22 | 20 |
| 3 | 186–450 | 520 | 730 | 0.33 | 12.5 | 16 |
| 4 | 230–350 | 540 | 730 | 0.37 | 21 | 19 |

[1] Exclusive of naphthalene in feed.

While it is possible to handle all types of creosote oil by our method, we prefer to eliminate by distillation or other means, the heavy ends normally present in commercial products, to minimize deposits on the catalyst. Thus, a 230–350° C. creosote-oil fraction will normally form negligible amounts of catalyst deposit whereas a fraction such as the 186°–450° C. oil may be troublesome in this respect.

A wide range of hourly space velocities (LHSV= volumes of liquid feed per hour per volume of catalyst) is permissible such as 0.1 to 3.0 v./v./hr. A preferred range of 0.25–1.0 is shown in the following examples where a creosote oil boiling between 230° and 350° C. was used as feed.

Table II

| Example | Temp. of Reaction, ° C. | $H_2$ Pressure, p.s.i.g. | LHSV, v./v./hr. | Percent of Feed Converted to Naphthalene | Percent of Feed Converted to Lower-Boiling Aromatics |
|---|---|---|---|---|---|
| 5 | 430 | 1,000 | 0.53 | 7.7 | 22 |
| 6 | 430 | 1,000 | 0.91 | 4.6 | 19 |
| 7 | 525 | 1,000 | 0.49 | 16.4 | 1.9 |
| 8 | 525 | 1,000 | 0.82 | 15.8 | 1.1 |
| 9 | 580 | 750 | 0.48 | 22.6 | 13 |
| 10 | 580 | 750 | 0.97 | 11.9 | 4 |

The use of regeneration and recycle stock is illustrated in the following examples made with a catalyst comprising 10% molybdenum on alumina. Example 11 gives the results after 16 hours of use with a 230°–350° C. creosote oil. The conversion declined slightly with 22.5 hours of further use. After a regeneration, recycle stock was used in Example 12. The recycle stock consists of material which has previously passed through the process, to which is added fresh creosote oil (230°–350° C.) to make up for creosote converted to naphthalene, lower-boiling aromatics, gas and other products. The test continued for 56 hours and another regeneration was then made. After regeneration, the conversion shown in Example 13 was observed. After 47 hours of use, another regeneration was made and recycle stock was converted with the results shown in Example 14. These examples demonstrate the regenerability of the catalyst and the conversion of high-boiling recycle from previous treatment in the process.

*Table III*

| Example | Temp. of Reaction, °C. | H² Pressure, p.s.i.g. | LHSV, v./v./hr. | Percent of Feed Converted to Naphthalene | Percent of Feed Converted to Lower-Boiling Aromatics |
|---|---|---|---|---|---|
| 11 | 525 | 1,000 | 0.27 | 17.2 | 11 |
| 12 | 525 | 1,000 | 0.27 | 14.7 | 28 |
| 13 | 525 | 1,000 | 0.27 | 11.3 | 21 |
| 14 | 525 | 1,000 | 0.27 | 11.2 | 16 |

The pressure requirements of our method require a partial pressure of hydrogen equivalent to at least 300 p.s.i. as shown in the following examples. Higher hydrogen pressures can be used to advantage but we prefer not to exceed 2500 p.s.i.

*Table IV*

| Example | Temp. of Reaction, °C. | Pressure Total,[1] p.s.i.g. | Pressure H₂ Partial, p.s.i.g. | LHSV, v./v./hr. | Percent of Feed[2] Converted to Naphthalene | Percent of Feed Converted to Lower-Boiling Aromatics |
|---|---|---|---|---|---|---|
| 15 | 540 | 1,000 | 112 | 0.51 | 0 | 4 |
| 16 | 540 | 1,000 | 381 | 0.51 | 3 | 7 |
| 17 | 540 | 1,000 | 510 | 0.51 | 6 | 9 |
| 18 | 540 | 1,000 | 1,000 | 0.51 | 9 | 21 |
| 19 | 570 | 215 | 215 | 0.42 | 2 | 3 |

[1] Balance is nitrogen except in Example 19.
[2] Feed is 230°–355° C. creosote oil.

The catalyst for the process is of the molybdenum type. The results cited in the following examples (Tables V and Va) indicate the broad limits of catalyst composition which affect the results of our method, particularly with reference to catalysts of the molybdenum type which also contain cobalt. The support can be any suitable composition which is beneficial to the action of the molybdenum-type catalyst.

*Table V*

| Example | Temp. of Reaction, °C. | H₂ Pressure, p.s.i.g. | LHSV, v./v./hr. | Percent of Feed Converted to Naphthalene | Percent of Feed Converted to Lower-Boiling Aromatics |
|---|---|---|---|---|---|
| 20 | 550 | 1,000 | 0.50 | [1] 11.5 | 9 |
| 21 | 560 | 1,000 | 0.54 | 13.2 | 9 |
| 22 | 540 | 1,000 | 0.25 | 16.0 | 16 |
| 23 | 540 | 1,000 | 0.5 | 9.9 | 27 |
| 24 | 540 | 1,000 | 0.5 | 14.0 | 14 |
| 25 | 540 | 1,000 | 0.25 | 14.0 | 21 |

[1] Recycle stock (230°–350° C. creosote oil).

*Table Va*

| Example | Catalyst Composition, Wt. Percent CoO | Catalyst Composition, Wt. Percent MoO₃ | Support |
|---|---|---|---|
| 20 | | 10.0 | activated Al₂O₃. |
| 21 | 3.5 | 22 | calcium-aluminum silicate. |
| 22 | 13 | 8 | activated Al₂O₃. |
| 23 | 2 | 14 | SiO₂—Al₂O₃ (83:13) cracking catalyst. |
| 24 | 12 | 9.5 | activated Al₂O₃ containing 2% SiO₂. |
| 25 | 3 | 10 | activated Al₂O₃. |

We have found that, unless sulfur is supplied in adequate amount with the feed stock or from some other source as by the recycling of some of the H₂S produced, the yield of naphthalene and lower-boiling compounds will be reduced. The initial fractionation of the creosote oil boiling over a range of from 185° to 440° C., to remove compounds boiling below 220° and above 350° C., tends to increase the net yield of naphthalene, because the reactions involved appear to proceed only until a predetermined equilibrium concentration of naphthalene is present.

It will be apparent from the foregoing that our invention provides a simple method for the treatment of creosote oil whereby it may be converted at reasonable cost with good yields, to naphthalene and other desirable products of greater value than the oil.

Although we have disclosed herein the preferred practice and embodiment of our invention, we intend to cover as well any change or modification therein which may be made without departing from the spirit and scope of the invention.

We claim:

1. In a method of making naphthalene and aromatic compounds having boiling points below that of naphthalene which consists in feeding creosote oil comprising substantially a mixture of polynuclear aromatic compounds including hydrocarbons and heterocyclic nitrogen, oxygen and sulphur compounds boiling between 220 and 350° C., through a reaction zone, maintaining in said zone a bed of catalyst containing a compound of molybdenum selected from the group consisting of the oxide and sulphide on an alumina support, heating said bed to a temperature of from 450 to 650° C., continuously introducing gaseous hydrogen into said zone under a pressure of from 500 to 2500 p.s.i.g., controlling the feeding of the mixture to maintain a liquid hourly space velocity of said mixture through said bed of from .2 to 3 v./v./hr., and maintaining in said mixture a sulphur content from 0.1 to 3% thereby causing a sulphided condition of the catalyst characterized by a mole ratio of sulphur to metal from .1 to 2.

2. A method as defined in claim 1, characterized by said catalyst containing a compound of cobalt selected from the group consisting of the oxide and sulphide.

References Cited in the file of this patent

UNITED STATES PATENTS

| 2,604,438 | Bannerot | July 22, 1952 |
| 2,700,638 | Friedman | Jan. 25, 1955 |

FOREIGN PATENTS

| 472,538 | Great Britain | Sept. 20, 1937 |